United States Patent
Cornish et al.

[11] 3,731,470
[45] May 8, 1973

[54] SELF-LEVELING COMBINE

[75] Inventors: George Kent Cornish; Melvin Louis Knollman, both of East Moline, Ill.

[73] Assignee: Deere & Company, Moline, Ill.

[22] Filed: Feb. 14, 1972

[21] Appl. No.: 225,874

[52] U.S. Cl.................56/10.4, 56/208, 56/DIG. 15, 280/6 H
[51] Int. Cl..............................A01d 67/00
[58] Field of Search................56/208, 209, 10.2, 56/10.4, DIG. 15; 280/6 R, 6 H, DIG. 1

[56] References Cited

UNITED STATES PATENTS

| | | | |
|---|---|---|---|
| 3,306,014 | 2/1967 | Halls et al. | 56/208 X |
| 3,589,115 | 6/1971 | Taylor et al. | 56/208 |

*Primary Examiner*—Russell R. Kinsey
*Assistant Examiner*—J. N. Eskovitz
*Attorney*—H. Vincent Harsha et al.

[57] ABSTRACT

The crop-gathering unit of a self-leveling combine is connected to the combine feeder house for movement about either one of a pair of pivots positioned at opposite sides of the feeder house so that as the crop-gathering unit pivots with respect to the feeder house, the bottom edge of the crop discharge opening in the crop-gathering unit is never below the bottom edge of the crop-receiving opening in the feeder house.

19 Claims, 6 Drawing Figures

FIG. 3

SELF-LEVELING COMBINE

BACKGROUND OF THE INVENTION

The present invention relates generally to self-leveling combines, and more particularly relates to a novel mechanism for pivotally mounting the crop-gathering unit on the combine feeder house.

Self-leveling or hillside combines are well known in the art and include, in addition to means for maintaining the main body of the combine substantially vertical, a pivotal mounting for the crop-gathering unit so that the crop-gathering unit can be maintained substantially parallel to the plane of the ground. To date, there have been basically two methods for pivotally mounting the crop-gathering unit on the feeder house. One method included a single fore-and-aft pivot positioned above the feeder house and the other method included a large circle pivot which encompassed the crop passage openings between the crop-gathering unit and the feeder house so that the axis of rotation of the crop-gathering unit with respect to the feeder house was substantially centered in the crop-passage opening. However, since the crop-passage openings are substantially rectangular, each of these two previous methods of pivoting the crop-gathering unit on the feeder house had the disadvantage of positioning a portion of the lower edge of the crop discharge opening of the crop-gathering unit below the lower edge of the crop-receiving opening in the feeder house whenever the crop-gathering unit was tilted with respect to the feeder house. This, of course, hampered the passage of crop material from the crop-gathering unit to the feeder house.

SUMMARY OF THE INVENTION

The principal object of the present invention is to provide a self-leveling combine in which the crop-gathering unit is pivoted on the feeder house in a manner which ensures that crop material does not have to move up over a lip as it passes from the crop-gathering unit to the feeder house.

A more specific object of the present invention is to provide a crop-gathering unit which is pivoted to the feeder house of a combine for movement about either one of a pair of pivots positioned at opposite sides of the feeder house so that as the crop-gathering unit is tilted with respect to the feeder house, the lower edge of the rear crop discharge opening in the crop-gathering unit is always above the lower edge of the forward crop inlet opening in the feeder house.

Another object of the present invention is to provide a novel hydraulic system for controlling the movement of the crop-gathering unit of a self-leveling combine in which the crop-gathering unit is pivoted on the feeder house for movement about either one of a pair of pivots positioned at opposite sides of the feeder house.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figure 1:
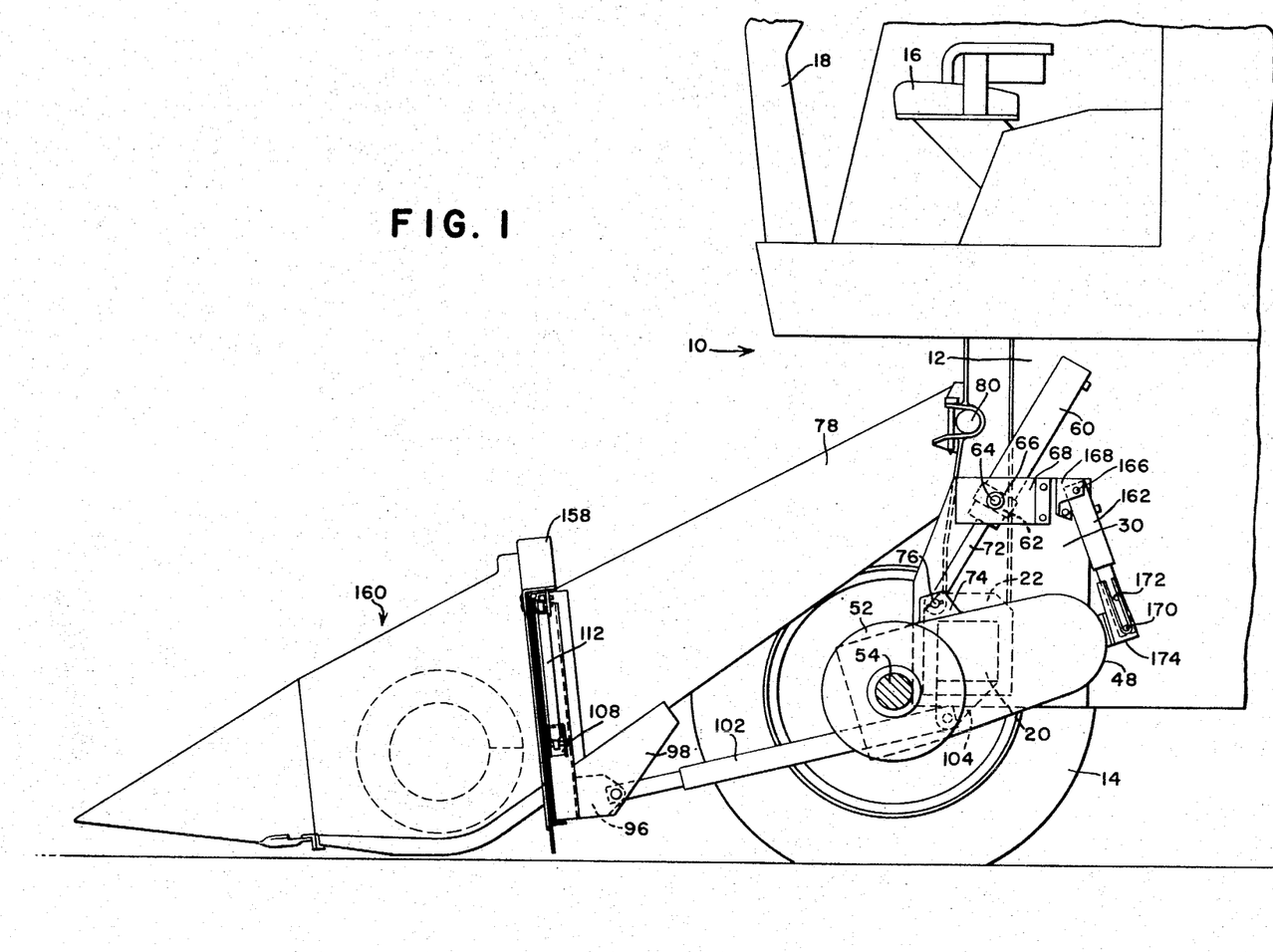
FIG. 1 is a side elevational view of the forward portion of a self-leveling combine according to the present invention, the near wheel being removed to illustrate the construction of the leveling arms.

Referring now to the drawings, a combine indicated generally at 10 includes a main separator body 12 supported by wheels 14. The combine illustrated is of the self-propelled type and includes an operator's platform having the conventional seat 16 and steering console 18. The main separator body includes a main transversely extending support tube 20 which has flanges 22 secured to its opposite ends by mounting plates 24 integral with the flanges 22. A leveling arm assembly indicated generally at 28 is secured to the flange 22 at each end of the main support tube 20. The leveling arm assemblies are of identical construction so only one is illustrated and described.

Figure 2:
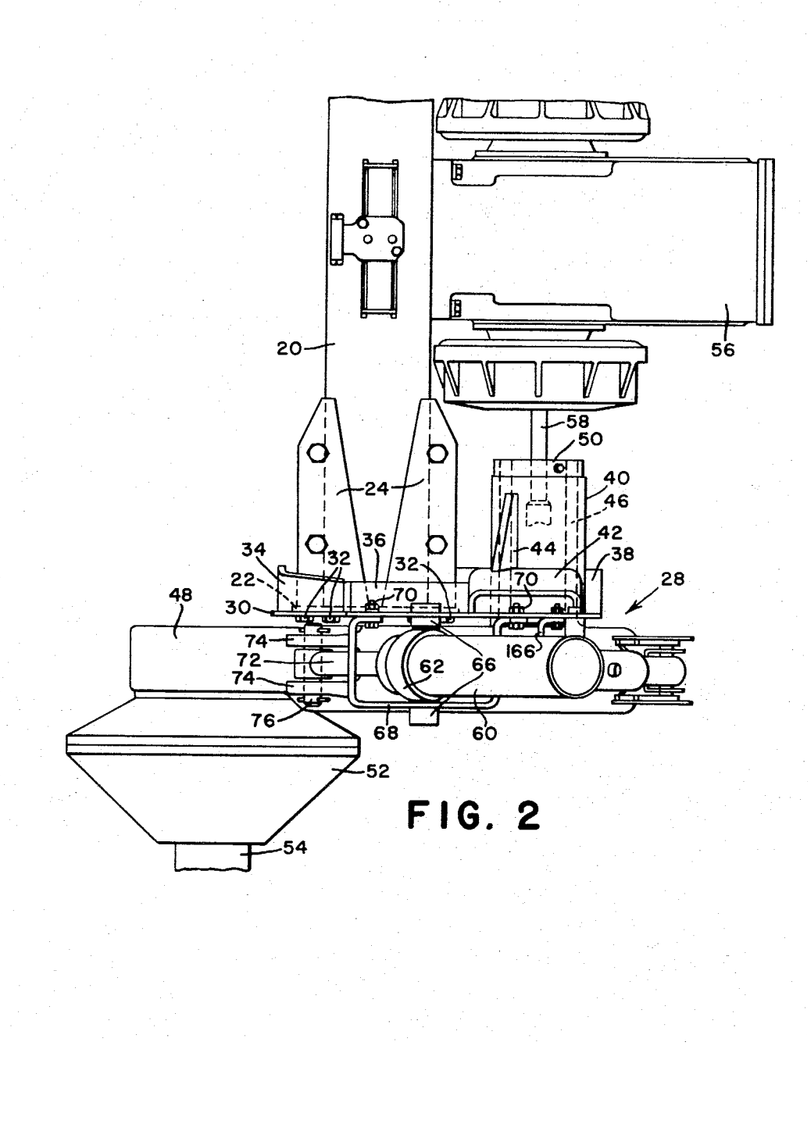
FIG. 2 is a top plan view of a leveling arm assembly used on the combine illustrated in FIG. 1.

Each of the leveling arm assemblies includes a mounting plate 30 secured to the flange 22 by bolts 32. Stiffener plates 34, 36 and 38 are secured to the mounting plate 30 in any suitable manner such as welding to lend rigidity to the mounting plate 30.

The mounting plate 30 extends both above and to the rear of the main support tube 20 and a bearing sleeve 40 is secured to the rear portion of the mounting plate. The bearing tube 40 is mounted in the plate 30 directly behind the main support tube 20 and extends inwardly therefrom. A generally U-shaped bracket 42 has its legs secured to the mounting plate 30 and its bight portion secured to the bearing tube 40 remote from the plate 30 to lend rigidity to the bearing tube 40. A gussett plate 44 between the bight portion of the bracket 42 and the tube 40 lends additional rigidity to the tube 40.

A pivot tube 46 integral with one end of a leveling arm 48 extends through the bearing tube 40 and is held within the bearing tube 40 by a clamp 50 which engages the inner end of the bearing tube 40. The leveling arm 48 extends generally forwardly and supports a final drive 52 at its forward end. The wheel 14 is mounted on the output 54 of the final drive 52. The power for the output of the final drive comes from a main transmission and differential unit 56 mounted on the main support tube 20. The output from the transmission 56 takes the form of a shaft 58 which extends through the axis of rotation of the pivot tube 46 to the pivot arm 48. A sprocket and chain assembly (undisclosed) is mounted in the pivot arm 48 to transfer power from the shaft 58 to the final drive 52.

The movement of the leveling arm 48 with respect to the main body 12 is controlled by a leveling cylinder 60. The leveling cylinder 60 is provided with a collar 62 which carries a pair of oppositely extending pivot members 64 which are journaled in bearing blocks 66 supported on an upper portion of the mounting plate 30 and a bracket 68 secured to the mounting plate 30 by bolts 70. The rod 72 of the hydraulic cylinder 60 is pivotally connected by a pin 76 between a pair of lugs 74 integral with the leveling arm 48. With this construction, extension of the cylinder 60 moves the forward end of the leveling arm downwardly with respect to the main body and retraction of the cylinder 60 moves the forward end of the leveling arm upwardly with respect to the main body.

A forwardly extending feeder house 78 has its rear end pivotally connected to the main body 12 by a pivot shaft 80. The feeder house includes a top wall 82, side walls 84 and a bottom wall 86. A right-angle mounting member 88 is secured to the forward end of each side wall of the feeder house by bolts or rivets 90. As can best be seen in FIG. 4, each of the mounting members 88 extends from near the top of the feeder house to a point below the feeder house and, as can be seen from FIGS. 3 and 5, the laterally extending leg of the mounting member is tapered from top to bottom. A transversely extending plate 92 has its opposite ends 92a secured to the lower ends of the laterally extending legs of the mounting members 88 in any suitable manner such as welding. An upper central portion 92b is bent rearwardly along a bend line 92c and secured to the top surface of the bottom wall 86 in any suitable manner such as welding.

Figure 3:
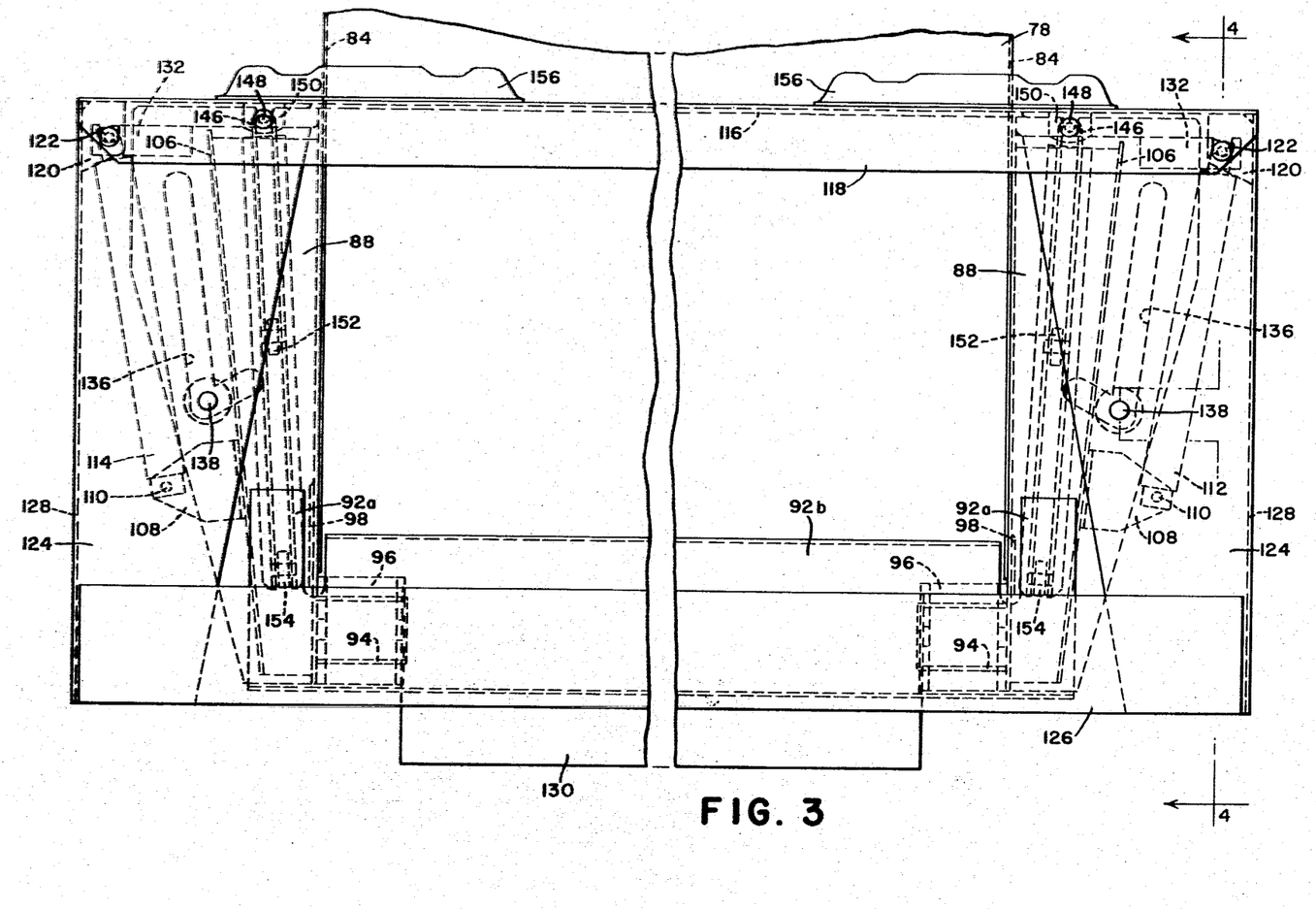
FIG. 3 is a front elevational view of the forward portion of the feeder house, the crop-gathering unit being removed.
Figure 4:
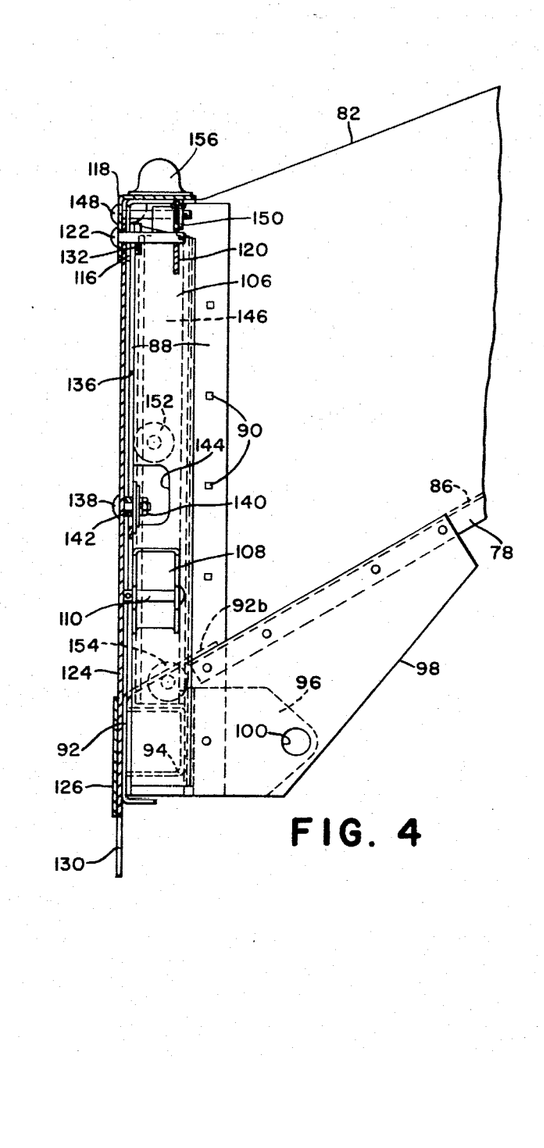
FIG. 4 is a sectional view taken substantially along the line 4—4 of FIG. 3, certain parts being removed for illustration purposes.

The legs of a short channel member 94 are welded to the back face of the plate 92 directly beneath each of the lower corners of the feeder house and also has one side secured to the fore-and-aft extending leg of the mounting member 88. The bight portion of a U-shaped bracket 96 is welded to the bight portion of each of the channel members 94 and the legs of each of the U-shaped brackets 96 extend rearwardly in laterally spaced relationship. A gussett plate 98 is secured to the forward end of each side wall along a lower portion thereof and also overlaps the rear portion of the lower end of the fore-and-aft extending leg of the mounting member 88. At the juncture of the side walls 84 and mounting members 88, the gussett plates are bent to fit flatly against both the side wall 84 and the mounting member 88. The gussett plates 98 are also secured to the outer leg of each of the brackets 96. The legs of the brackets 96 and the gussett plate 98 are provided with transversely aligned apertures 100 which receive mounting pins for one end of hydraulic cylinders 102. The opposite end of the hydraulic cylinders 102 are pivotally connected to brackets 104 on the bottom of the main support tube 20 so that upon extension and retraction of the hydraulic cylinders 102, the feeder house 78 is raised and lowered about the pivot 80. The channel members 94 serve to transfer the force on brackets 96 to the plate 92.

A pair of cylinder mounting members 106 which are L-shaped in cross section are secured to the rear of the mounting members 88 as by welding or the like and in combination with the support members 88, form open-ended guide tubes. The cylinder mounting members 106 are tapered from top to bottom so the guide tubes formed by the mounting members 88 and 106 are tapered from top to bottom. A cylinder mounting bracket 108 is secured to the fore-and-aft extending leg of each of the cylinder mounting members 106 remote from the upper end thereof, and each is provided with a pair of fore-and-aft spaced legs having aligned apertures for the reception of a cylinder mounting pin 110. The pins 110 also extend through apertured mounting blocks on the anchor end of a pair of left- and right-hand tilting cylinders 112 and 114 respectively.

The upper ends of the mounting members 88 are interconnected by an elongated and transversely extending angle member 116 which has the ends of its vertically extending leg secured to the forward faces of the laterally extending legs of the mounting members 88 and has its horizontally extending leg resting on top of the fore-and-aft extending legs of the mounting members 88. The outer ends of the horizontally extending legs have been removed so as to not interfere with the movement of parts to be described hereinafter. In addition to lending rigidity to the forward end of the feeder house by interconnecting the mounting members 88, the right-angle member 116 also provides support for a crop-gathering unit mounting frame to be described hereinafter when the crop-gathering unit mounting frame is in a level position with respect to the feeder house.

The right-angle member 116, plate 92 and the support members 88 define the periphery of a forward crop inlet opening for the feeder house.

The crop-gathering unit mounting frame includes a generally transversely extending right-angle member 118 which rests upon the right-angle member 116 when the mounting frame is in a level position with respect to the feeder house. The ends of the right-angle member 118 extend beyond the lateral edges of the mounting members 88 and each has a depending lug 120 secured to its horizontally extending leg. Each end of the vertically extending leg of the right-angle member 118 and the lugs 120 are provided with aligned apertures which receive pivot pins 122 which pivotally mount the rod ends of the hydraulic cylinders 112 and 114 between the lugs 120 and the vertically extending leg of the right-angle member 118.

A pair of plates 124 which are tapered from top to bottom have their upper ends secured to the inner face of the vertical leg of the right-angle member 118 adjacent the outer ends thereof in any suitable manner such as welding and have their lower ends interconnected by an elongated transversely extending plate 126 which has its ends secured to the lower ends of the plates 124 in any suitable manner such as welding. The upper edge of the elongated plate 126 is positioned in alignment with the bend line of the mounting plate 92 when the mounting frame is in a level position with respect to the feeder house. Adjacent its outer edge, each of the plates 124 is provided with an integral rearwardly extending flange 128 which lends rigidity to the mounting frame and provides lateral protection for its associated hydraulic cylinder.

The right-angle member 116, and plates 124 and 126 define the periphery of a crop transfer opening in the mounting frame. Because of the taper on the plates 124, the crop transfer opening in the mounting frame is shaped differently from the crop inlet opening in the forward end of the feeder house, but the reason for this will become apparent in the hereinafter description of operation. The mounting frame is also provided with a depending closure plate 130 which is secured to the rear face of the elongated plate 126, and the purpose of the mounting plate 130 will also be explained in the hereinafter description of operation.

A strap 132 is secured to the upper outer edge of the laterally extending leg of each of the support members 88 and extends slightly therebeyond. The outer end of each of the strap members 132 is provided with an upwardly opening recess 134 which is adapted to receive the pivot pin 122 of the associated hydraulic cylinders 112 and 114. Each of the straps 132 forms a pivot support member, and, when the pivot pin 122 is nestled within the recess 134, the combination of the pivot support member and pivot pin forms pivot means about which the mounting frame can tilt with respect to the feeder house.

The movement of the mounting frame with respect to the feeder house is limited to a plane parallel to the plane of the forward end of the feeder house by guide means which act between the mounting frame and the mounting members 88. In the illustrated embodiment of the invention, there are actually two guide means at each side of the feeder house.

One of the guide means includes an elongated slot 136 provided in the laterally extending leg of each of the mounting members between the outer edge thereof and the fore-and-aft extending leg of the cylinder mounting member. A bolt 138 extends through an aperture provided in each of the mounting plates 124 and through the associated slot 136. Washers and a nut 140 on each of the bolts 138 retain the bolts, and a ferrule 142 on each of the bolts 138 prevent tightening of the nuts 140 to the point where either the plate 124 or the mounting member 88 is deformed. The two slots 138 have a slight convergence downwardly so that as the mounting frame is tilted about one of the pivot means, the ferrule on the bolt on the opposite side of the mounting frame will not bind in its slot. Also, each of the slots has an inwardly and slightly upwardly extending leg at its lower end so that the bolt and ferrule on the same side of the feeder house as the pivot means can move into the leg and won't prevent the tilting movement of the mounting frame due to engagement with the lower edge of the slot.

To accommodate the movement of the bolt and ferrule into the inwardly and upwardly extending leg of the slot, a portion of the cylinder mounting member has been cut away at 144 to permit passage of the bolt, washers and nut.

The second form of guide means includes a U-shaped member 146 having elongated legs which extend into the guide tube formed by the cylinder mounting member 106 and mounting member 88. A pin 148 extends through aligned apertures provided in the vertically extending leg of the right-angle member 118 and a lug 150 secured to the fore-and-aft extending leg of the right-angle member 118, and between the legs of the U-shaped guide member 146 so that the guide member will be moved upwardly with the mounting frame. Each of the legs of the U-shaped guide member is of channel shape to ensure sufficient rigidity. Upper and lower rollers 152 and 154 are mounted between the legs of the U-shaped guide member 146 and engage the front and rear walls of the guide tube formed by the mounting member 88 and cylinder mounting member 106.

A pair of spaced lugs 156 are provided on the top of the right-angle member 118 for insertion into corresponding recesses provided in the upper rail 158 of a conventional crop-gathering unit indicated generally at 160. The crop-gathering unit is illustrated as a grain platform, but those skilled in the art will understand that other units such as a corn head could also be used. The attachment between the mounting frame and crop-gathering unit is of the type more particularly described and claimed in U. S. Pat. No. 26,512 which issued on 31 Dec. 1968 to G. W. Rohwedder.

Extension of the cylinders 112 and 114 and thus the tilting of the mounting frame and crop-gathering unit with respect to the feeder house is controlled by a pair of control cylinders 162 and 164 mounted on the mounting plates 30 on the left- and right-hand sides, respectively, of the combine. The anchor end of each of the cylinders 162 and 164 is pivotally mounted on a pin 166 which extends between the mounting plates 30 and a bracket 168 secured to the mounting plate 30. A pin 170 is mounted medially its ends on the end of the rod of each of the cylinders 162 and 164. Each end of the pin 170 on each of the cylinders 162 and 164 extends into an upwardly open slot 172 provided in a bracket 174 secured to the rear of each of the leveling arms 48. There are two brackets 174 secured to each of the leveling arms 48 in spaced apart relationship so that the rods of the cylinders extends between the brackets. The pins 170 and slots 172 provide a one-way connection between the control cylinders 162 and 164 and the leveling arms 48 so that when one of the wheels 14 is lowered with respect to the main body 12 of the combine 10, the associated control cylinder will be retracted while the other control cylinder will be allowed to extend. The cylinders 162 and 164 are of such a length that they contact the bottom of the slots only through half the movement of their respective leveling arm.

Figure 6:
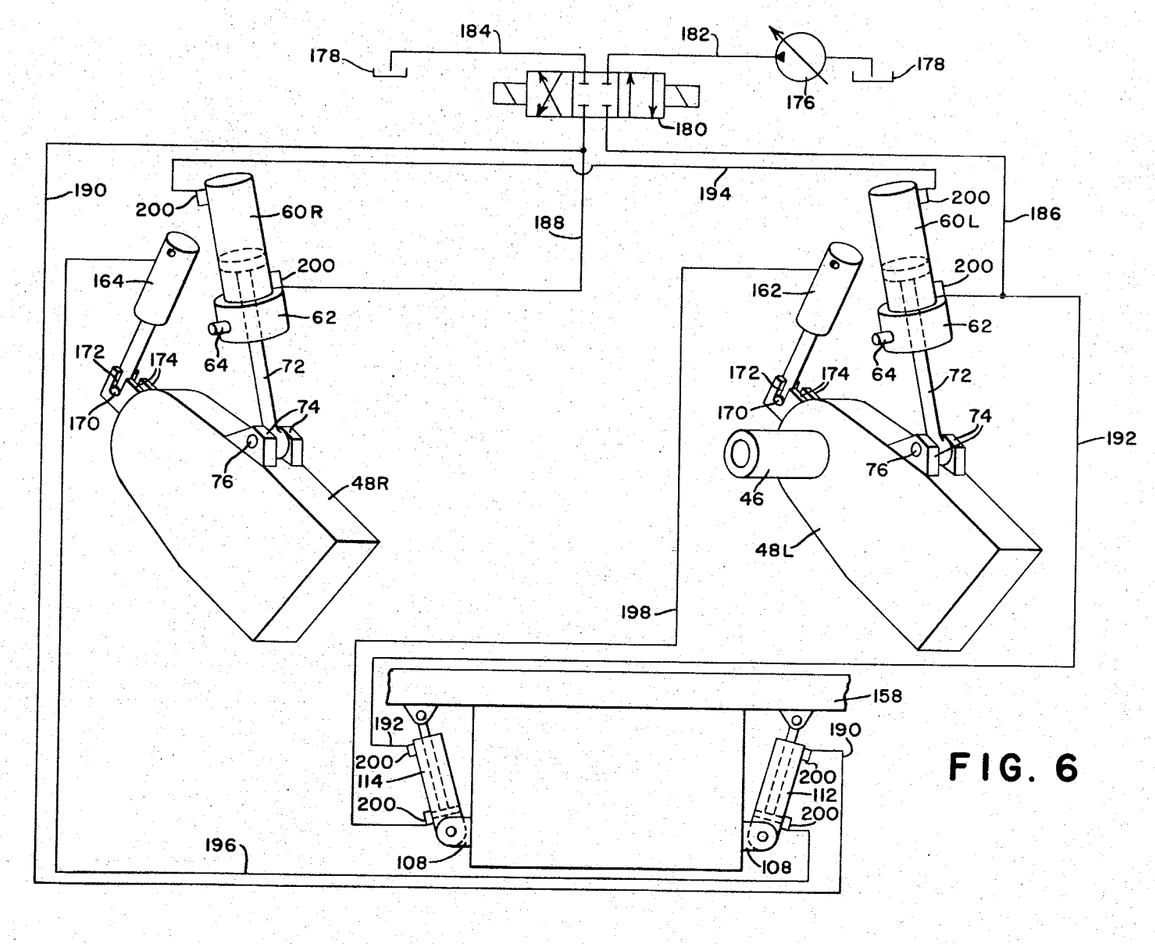

The overall hydraulic system is schematically illustrated in FIG. 6, and includes a pump 176 and fluid reservoir 178. The pump and reservoir are connected to one side of a three-position, four-way solenoid valve 180 by fluid lines 182 and 184. The opposite side of the valve 180 is connected to the rod ends of the leveling cylinders 160L and 160R by fluid lines 186 and 188 respectively. The rod end of the tilting cylinders 112 and 114 are also connected to the fluid lines 188 and 186, respectively, by fluid lines 190 and 192. The anchor ends of the leveling cylinders 60L and 60R are interconnected by a fluid line 194, the anchor end of the tilting cylinder 112 is interconnected with the anchor end of the control cylinder 164 by a fluid line 196, and the anchor end of the tilting cylinder 114 is interconnected with the anchor end of the control cylinder 162 by a fluid line 198. The leveling cylinders 60L and 60R and the tilting cylinders 112 and 114 are all provided with a bypass passage 200 at each end so that when any one of these cylinders is moved to its limit in one direction, fluid is free to pass therethrough.

When the combine is operating on level ground, the mounting frame and crop-gathering unit will be in the positions illustrated in FIGS. 1, 3, 4 and 6, and the leveling cylinders 60L and 60R and control cylinders 162 and 164 will be in the positions illustrated in FIGS. 1 and 6. As the combine moves onto a ground surface which slopes downwardly to the right, right and left being determined by looking in the direction of combine movement, a conventional attitude sensing mechanism (not illustrated) will sense the tilt of the main body and move the solenoid valve 180 in a direction to interconnect the rod end of the leveling cylinder 60L with the pump 176 and the rod end of the leveling cylinder 60R with the reservoir 178. As fluid is supplied to the rod end of the leveling cylinder 60L, the left-hand wheel is raised with respect to the main body and fluid from the anchor end of the leveling cylinder 60L is routed through the anchor end of the leveling cylinder 60R to lower the right wheel with respect to the main body. This movement of the wheels results in leveling of the main body or returning the main body back to its substantially vertical attitude.

As fluid is supplied to the rod end of leveling cylinder 60L, it is simultaneously supplied to the rod end of the tilting cylinder 114 to hydraulically lock the tilting cylinder 114 in its retracted position and hence lock the right-hand pivot pin 122 in the recess provided in the right-hand strap 132. Also, as the wheel mounting arm 48R is moved downwardly about its pivot 46 to lower the right-hand wheel, engagement between the pin on the cylinder 164 and the lower end of the slots 72 causes the control cylinder 164 to be compressed or retracted, thereby forcing fluid through the line 196 to the anchor end of the tilting cylinder 112. The fluid forced into the anchor end of the tilting cylinder 112 extends the cylinder 112 and tilts the mounting frame about the right-hand pivot means as illustrated in FIG. 5 so that the crop-gathering unit remains substantially parallel with respect to the ground surface.

Figure 5:
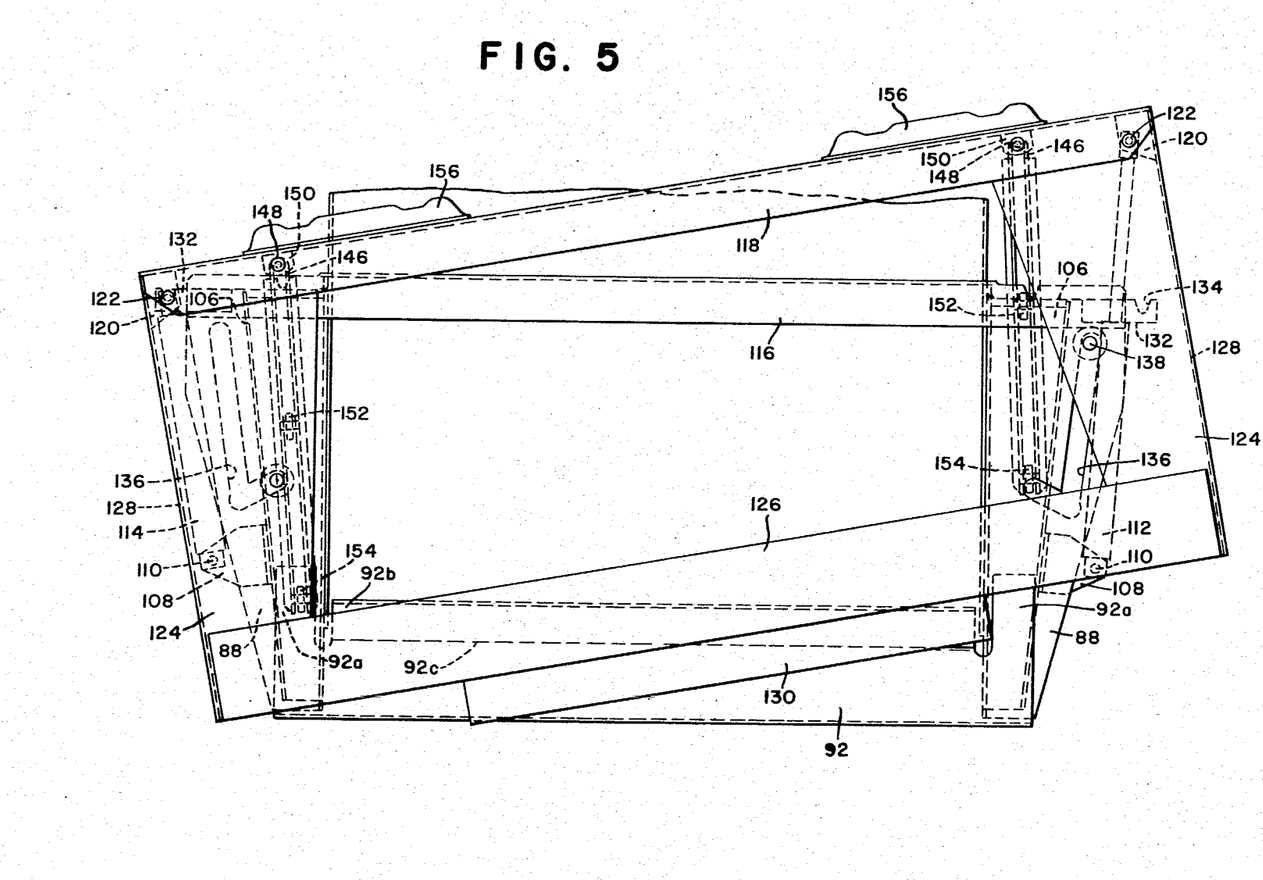
FIG. 5 is a view similar to FIG. 3 but illustrating the crop-gathering unit mounting frame in a tilted position with respect to the feeder house; and, FIG. 6 is a schematic illustration of the hydraulic control system according to the present invention.

As the mounting frame is tilted as illustrated in FIG. 5, the bolt and ferrule 138 and 142 on the right-hand side of the feeder house move into the inwardly directed leg of the slot 136 and provide an additional lock to hold the right-hand pivot pin 122 in the notch provided in the right-hand strap 132. The U-shaped guide member 146 cooperates with the guide tube formed by the mounting member 88 and cylinder mounting member 106 to prevent the weight of the crop-gathering unit from pulling the mounting frame away from the feeder house.

If the leveling cylinders 60L and 60R are retracted or extended, respectively, to their full extent, fluid will flow through the bypass passages 200 so that if either of the cylinders 60L or 60R has not reached its limit of movement in one direction when the other has, the free flow of fluid through the cylinder which has reached its limit of movement will permit the other cylinder to continue its movement until both cylinders reach the end of their stroke. The same is true for the tilting cylinders 112 and 114. The bypass passage 200 and the anchor end of the tilting cylinder 114 will permit fluid to flow through the cylinder to the control cylinder 162 to ensure that the control cylinder 162 is fully extended. The bypass passage 200 in the rod end of the tilting cylinder 112 permits fluid to flow through the cylinder 212 if the cylinder 212 is fully extended before the control cylinder 164 is fully retracted.

As the leveling cylinders 60L and 60R bring the main body of the combine back to its vertical attitude, the control valve is moved back to its neutral position by the attitude sensing means. If the combine then travels back onto a level ground surface or one that slopes downwardly to the left, the attitude sensing means will move the valve 180 in a direction to interconnect the rod end of cylinder 60R with the pump and the rod end of cylinder 60L with the reservoir to raise the right-hand wheel with respect to the main body and lower the left-hand wheel with respect to the main body. As the Right-hand wheel is being raised, the rod end of tilting cylinder 112 is also interconnected with the pump 76 by fluid line 190 so that the cylinder 112 will be retracted to return the mounting frame to its neutral position. However, the retraction of the tilting cylinder 112 is limited by extension of the control cylinder 164 which in turn is limited by the movement of the wheel mounting arm 48R. In this manner, the return of the mounting frame to its level position with respect to the feeder house is synchronized with the return of the wheel mounting arms to their level position. As the mounting frame reaches its neutral position, the tilting cylinder 112 is hydraulically locked so that if the combine has passed onto a ground surface which slopes downwardly to the left, the tilting cylinder 114 will raise the right-hand side of the mounting frame about the left-hand pivot pin 122.

From FIG. 5 it can be seen that as the mounting frame is tilted with respect to the feeder house, the bottom edge of the plate 126 raises above the bottom periphery of the crop inlet opening in the feeder house but that the closure plate 130 which extends below the plate 126 effectively closes the opening to prevent loss of crop material. It can also be seen that, because of the taper on the side plates 124, they do not block off any of the crop inlet openings in the feeder house.

From the foregoing descriptions of construction and operation, it can be seen that the present invention provides a novel mounting for a tiltable crop-gathering unit which will keep the lower edge of the crop discharge opening in the crop-gathering unit above the lower edge of the crop inlet opening in the feeder house irrespective of the position of the crop-gathering unit with respect to the feeder house. It can also be seen that the present invention provides a novel hydraulic system for controlling the movement of the crop-gathering unit with respect to the feeder house.

Although only a single preferred embodiment of the invention has been described and illustrated, various modifications within the spirit and scope of the invention will become apparent to those skilled in the art and can be made without departing from the underlying principles of the invention. Therefore, the invention should not be limited by the specific illustration and description but only by the following claims.

We claim:

1. In combination, a combine feeder house having a forward crop inlet opening, a crop-gathering unit having a rear crop discharge opening and a transversely extending support member adapted to rest on the top forward edge of the feeder house when the crop-gathering unit is in a level position with respect to the feeder house, and a pair of extensible and retractable hydraulic cylinders connected between the sides of the feeder house and the support member, whereby, by alternately extending and retracting the hydraulic cylinders, the crop-gathering unit can be moved from a level position with respect to the feeder house to any one of a plurality of tilted positions with respect to the feeder house.

2. A combination as set forth in claim 1 wherein guide means acting between the feeder house and crop-gathering unit limit the crop-gathering unit to movement about axes normal to the plane of the crop inlet opening in the feeder house.

3. A combination as set forth in claim 2 wherein a pivot support is secured to each side of the feeder house and each is provided with an upwardly open pivot pin receiving aperture, each of the hydraulic cylinders is pivotally connected to the support member by a pivot pin, and each of the pivot pins is adapted to rest in the aperture provided in the corresponding pivot support when its respective cylinder is retracted, whereby, when one of the cylinders is extended the crop-gathering unit can move about the pivot pin connecting the other cylinder to the support member.

4. In combination with a combine feeder house having a forward crop inlet opening and cooperating with a crop-gathering unit having a rear crop discharge opening, a pair of hydraulic cylinders pivotally anchored to the sides of the feeder house near the forward end thereof, a pivot member supported by the free end of each of the cylinders, a crop-gathering unit mounting frame supported by the pivot members and having a crop passage opening, and means on the mounting frame for attachment to and for supporting said crop-gathering unit, whereby, by extending and retracting of the cylinders, the crop-gathering means can be moved between a level position with respect to the feeder house and tilted positions with respect to the feeder house.

5. A combination as set forth in claim 4 wherein guide means act between the forward portion of the feeder house and the mounting frame to limit movement of the mounting frame relative to the feeder house to a plane fixed relative to the feeder house.

6. A combination as set forth in claim 5 wherein a support member is secured to each side of the feeder house, and each support member is provided with a recess to receive the corresponding pivot member when the corresponding cylinder is retracted.

7. A combination as set forth in claim 5 wherein there is a guide means at each side of the feeder house and each includes a plate member extending laterally from the forward end of the feeder house, slot means provided in the plate member, a pin carried by the mounting frame and extending through the slot means, and restraining means on the free end of the pin preventing movement of the mounting frame away from the feeder house.

8. A combination as set forth in claim 5 wherein there is a guide means at each side of the feeder house and each includes an upwardly open guide tube secured to the side of the feeder house, an elongated rigid guide member positioned in the guide tube in contact with the front and rear walls of the guide tube and having its upper end connected to the mounting frame for movement therewith.

9. A combine comprising: a main separator body; wheel means; wheel mounting means adjustably supporting the main body on the wheel means for vertical movement of the wheel means with respect to the main body; means acting between the main body and the wheel mounting means to move the wheel means on opposite sides of the main body in opposite vertical directions with respect to the main body in response to movement of the main body from a vertical position to maintain the main body in a substantially vertical position; a forwardly extending feeder house mounted on the main body for pivotal movement about a transverse axis, a pivot support member secured to each side of the feeder house adjacent the forward end thereof; an upwardly open recess provided in each support member; a mounting frame positioned closely adjacent to and parallel to the forward end of the feeder house; a pair of pivotal members connected to the mounting frame and extending rearwardly therefrom to normally be positioned in and supported by the recesses in the support members so that each pivot member, when positioned in the recess of the corresponding support member defines pivot means about which the mounting frame can move relative to the feeder house; guide means acting between the feeder house and mounting frame limiting the mounting frame to movement normal to the pivot means; a crop-gathering unit connected to the mounting frame; and means cooperative among the mounting frame, feeder house, and wheel mounting means to move the mounting frame and connected crop-gathering unit about one of the pivot means in response to movement of the wheel means relative to the main body to maintain the crop-gathering unit substantially parallel to the plane of the ground irrespective of the attitude of the main body with respect to the plane of the ground.

10. A combine as set forth in claim 9 wherein the means cooperative among the mounting frame, feeder house, and wheel mounting means further including means responsive to movement of the wheel means with respect to the main body in a direction which results in raising one side of the mounting frame about the pivot means on the other side to lock the pivot member on the other side in its respective recess.

11. A combine as set forth in claim 9 wherein the guide means includes means which locks one of the pivot members in its respective recess when the other pivot member is moved from its respective recess in response to movement of the wheel means with respect to the main body.

12. A combine as set forth in claim 9 wherein the means cooperative among the mounting frame, the feeder house and the wheel mounting means includes a pair of hydraulic cylinders anchored to the opposite sides of the feeder house and to their respective pivot member to raise the mounting frame about the opposite pivot means when extended; a second pair of hydraulic cylinders hydraulically connected to the first pair of hydraulic cylinders and acting between the wheel mounting means and main body to be compressed thereby.

13. A combine comprising: a main separator body; wheel means; wheel mounting means adjustably supporting the main body on the wheel means for vertical movement of the wheel means with respect to the main body; means acting between the main body and the wheel mounting means to move the wheel means on opposite sides of the main body in opposite vertical directions with respect to the main body in response to movement of the main body from a vertical position to maintain the main body in a substantially vertical position; a forwardly extending feeder house mounted on the main body for pivotal movement about a transverse axis; means mounting a crop-gathering unit on the forward end of the feeder house for movement about either one of a pair of fore-and-aft extending axes positioned on opposite sides of a fore-and-aft centerline through the feeder house and crop-gathering unit; and means cooperative among the crop-gathering unit, feeder house, main body and wheel mounting means to move the crop-gathering unit about one of the pair of axes in response to movement of the wheel means relative to the main body to maintain the crop-gathering unit substantially parallel to the plane of the ground irrespective to the attitude of the main body with respect to the plane of the ground.

14. A combine as set forth in claim 13 wherein the eans cooperative among the feeder house, crop-gathering unit, main body, and wheel mounting means includes a first pair of hydraulic cylinders anchored between the feeder house and crop-gathering unit on opposite sides of the fore-and-aft centerline so that extension of one of the cylinders pivots the crop-gathering unit about the pivot axis on the opposite side of the fore-and-aft centerline, and a second pair of hydraulic cylinders hydraulically connected to the first pair and operatively connected between the main body and the wheel mounting means to be compressed by movement of the wheel mounting means relative to the main body.

15. A combine comprising: a main separator body; a wheel mounting arm pivotally connected to each side of the main body and extending generally forwardly therefrom; a main wheel mounted at the free end of each mounting arm; a pair of leveling cylinders connected between the main body and wheel mounting arms to raise and lower the wheels relative to the main body in response to movement of the main body from a generally vertical attitude to maintain the main body in a generally vertical attitude; a forwardly extending feeder house attached to the forward end of the main body; means mounting a crop-gathering unit on the forward end of the feeder house for pivotal movement about either one of a pair of fore-and-aft extending axes positioned adjacent opposite sides of the feeder house; a pair of tilting cylinders connected between the feeder house and the crop-gathering unit so that extension of one of the tilting cylinders moves the crop-gathering unit about one of the pair of axes and extension of the other tilting cylinder moves the crop-gathering unit about the other of the pair of axes; a pair of control cylinders connected to opposite sides of the main body; fluid line means connecting each of the control cylinders to one of the tilting cylinders to extend the tilting cylinder upon retraction of the control cylinder; and means on each of the wheel mounting arms engageable with the free end of its respective control cylinder to compress the same upon movement of the wheel mounting arm in one direction to thereby tilt the crop-gathering unit with respect to the feeder house.

16. A combine as set forth in claim 15 wherein each of the control cylinders has a one-way connection with its respective wheel mounting arm and is effective through only one-half the total movement of its respective wheel mounting arm.

17. A combine as set forth in claim 16 wherein each of the wheel mounting arms has a generally rearwardly projecting bracket means provided with upwardly open pocket means which receive the free end of the respective control cylinder.

18. A combine as set forth in claim 17 wherein each of the cylinders has rod and anchor ends, the first-mentioned fluid line means interconnect the anchor end of each control cylinder with the anchor end of the tilting cylinder on the opposite side of a fore-and-aft centerline through the main body, feeder house and crop-gathering unit, further fluid line means interconnect the rod end of each leveling cylinder with the rod end of the tilting cylinder on the opposite side of the fore-and-aft centerline, another fluid line means interconnects the anchor ends of the leveling cylinders, and additional fluid lines connected to the rod ends of the leveling cylinders are adapted to be alternately connected to a source of fluid pressure and a fluid reservoir whereby as one of the wheels is raised above its midposition with respect to the main body the tilting cylinder on the opposite side of the fore-and-aft centerline is hydraulically locked in its retracted position and the tilting cylinder on the same side of the fore-and-aft centerline is extended to tilt the crop-gathering unit about the axis on the opposite side of the fore-and-aft centerline.

19. A combine as set forth in claim 18 wherein each of the leveling and tilting cylinders is provided with a fluid bypass passage means at each end to afford the flow of fluid through any one of the leveling and tilting cylinders when they are fully extended or retracted.

* * * * *